(12) United States Patent
Emery

(10) Patent No.: US 6,677,848 B1
(45) Date of Patent: Jan. 13, 2004

(54) HIGH-VOLTAGE WINDING INCLUDING DOUBLE-SIDED INSULATING TAPE AND ASSOCIATED METHODS

(75) Inventor: Franklin T. Emery, Fort Payne, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/186,824

(22) Filed: Jul. 1, 2002

(51) Int. Cl.[7] ............................................... H01F 27/30
(52) U.S. Cl. .................. 336/206; 29/602.1; 174/120 R
(58) Field of Search ............................... 336/206, 209; 174/120 R; 29/602.1

(56) References Cited

U.S. PATENT DOCUMENTS

| | | | | |
|---|---|---|---|---|
| 4,132,858 A | * | 1/1979 | Anderson et al. | 174/120 SR |
| 5,973,269 A | * | 10/1999 | Draper et al. | 174/120 R |
| 6,051,793 A | * | 4/2000 | Byrne et al. | 174/120 R |
| 6,075,303 A | | 6/2000 | Schuler | 310/301 |
| 6,190,775 B1 | | 2/2001 | Smith et al. | 428/417 |
| 6,194,665 B1 | * | 2/2001 | Kuribayashi et al. | 174/120 R |
| 6,238,790 B1 | | 5/2001 | Smith et al. | 428/379 |

* cited by examiner

Primary Examiner—Anh Mai

(57) ABSTRACT

A high-voltage winding is described for use in a dynamo-electric machine. The high-voltage winding includes an electrical conductor (12), an insulator (14) surrounding the electrical conductor, and an electrically conductive layer (16) surrounding the insulator. The insulator (14) may include a tape (18) arranged to define a wrapped layer. A double-sided tape may be provided that includes a flexible tape substrate (20) with an inner major surface (22) adjacent the conductor (12) and an outer major surface (24) opposite the inner major surface. An inner silicate layer (26) may be secured to the inner major surface and an outer silicate layer (28) to the outer major surface. A single-sided tape may also be provided between the conductors and double-sided tape.

24 Claims, 4 Drawing Sheets

HIGH-VOLTAGE WINDING INCLUDING DOUBLE-SIDED INSULATING TAPE AND ASSOCIATED METHODS

FIELD OF THE INVENTION

The present invention relates generally to high-voltage windings, and more particularly to insulated high-voltage windings.

BACKGROUND OF THE INVENTION

High-voltage windings are used in various dynamoelectric machines, such as motors or generators. For example, high-voltage windings commonly referred to as stator windings are used in high-voltage electrical generators. A high-voltage winding, such as a stator winding, can be formed from at least one winding bar that, in turn, comprises one or more electrical conductors. The electrical conductors individually are formed of a highly conductive material, such as copper. The electrical conductors are ordinarily individually-insulated and bundled together to form the winding bar. The bundle, in turn, is surrounded by insulation, often referred to as a winding insulator or groundwall insulator. The groundwall insulator can be a single-sided epoxy resin/mica paper tape wrapping, usually comprising multiple layers of a glass-backed mica paper tape.

Overlaying the groundwall is an outer conductive ground electrode that surrounds the groundwall insulator. The outer conductive ground electrode can be a coating of conductive paint or a wrapped conductive tape over the groundwall insulator. The outer conductive ground electrode is connected to ground so that the voltage of the outer surface of the high-voltage winding is at ground potential.

Over time, especially at high temperatures, partial discharge (PD) activity can occur within the high-voltage winding causing damage to the outer conductive electrode of the winding. Used in an air-cooled generator, a high-voltage winding is especially prone to PD activity because partial discharges may occur at a relatively low voltage in air.

Various insulation materials and techniques have been proposed for reducing or eliminating PD activity in high-voltage windings. U.S. Pat. No. 6,190,775 to Smith et al., for example, discloses a flexible insulating tape comprising a silicate matrix (i.e., mica or mica-like matrix) with intercalated metal ions and having a flexible backing. The tape is applied to a high-voltage winding in thin cross-sections to provide insulation. U.S. Pat. No. 6,075,303 to Schuler discloses insulation formed of layers of mica paper arranged on a base, the base being composed of polyimide or polyethylene naphthalate and containing a metal oxide, such as aluminum oxide or boron nitride, as a filler.

FIGS. 1A and 1B illustrate a conventional groundwall insulation 9. The groundwall insulation 9 is formed of layers of woven glass fibers 11 surrounded by resin 15 and backed by a mica paper layer 17. Voids 13 can form in the resin 15 surrounding the woven glass fibers 11. When these voids 13 extend, as illustrated, to the surface of the groundwall insulation 9, the surface of the groundwall insulation tends to be pitted or rough. This leaves voids between the outer surface of the groundwall insulation 9 and the outer conductive electrode (not shown). If even small voids exist between the outer surface of the groundwall insulator 9 and the conductive ground electrode, then PD can occur between the outer surface of the groundwall insulation and the outer conductive ground electrode. Partial discharge can damage the outer conductive ground electrode, causing the inside surface of the ground electrode to erode. Once damage occurs to the outer conductive ground electrode it can lead to subsequent damage to the groundwall insulation owing to the development of greater PD activity.

Exposing the high-voltage winding to high temperatures accelerates the deterioration by causing relative expansion and separation between the groundwall insulator and the outer conductive ground electrode. Once damage occurs to the conductive electrode, corona activity can occur between the ground electrode and surfaces of the conductors. The corona damage may also accelerate the deterioration of the ground electrode, which, in turn, can erode the groundwall insulator. The problem is particularly acute in the context of electrical generators where failure of the ground plane on the outer surface of the stator winding can lead to coil slot discharges that erode the groundwall insulator and, over time, can lead to a complete breakdown of the groundwall insulator and subsequent stator winding failure.

SUMMARY OF THE INVENTION

In view of the foregoing background, it is an object of the present invention to provide a high-voltage winding that is less susceptible to insulation breakdown that can result in winding failure.

This and other objects, features, and advantages in accordance with the present invention are provided by a high-voltage winding that includes at least one electrical conductor, an insulator around the at least one electrical conductor, and an electrically conductive layer surrounding the insulator. The insulator may include at least one tape that is arranged to define at least one wrapped layer surrounding the at least one electrical conductor. The tape, more particularly, may be a double-sided tape. In other words, the tape may include a flexible substrate having an inner major surface adjacent the at least one electrical conductor, and an outer major surface opposite the inner major surface. An inner silicate layer may be secured to the inner major surface of the flexible tape substrate. An outer silicate layer may be secured to the outer major surface of the flexible tape substrate.

The double-sided tape, moreover, may define at least an outermost wrapped layer of the insulator. In addition, the double-sided tape may be arranged to define at least one half-lapped wrapped layer, or, alternately, the double-sided tape may be arranged to define at least one butt-lapped wrapped layer.

The insulator may further include a single-sided tape arranged in a plurality of wrapped layers between the at least one electrical conductor and the double-sided tape. The single-sided tape may also have a flexible tape substrate. The substrate of the single-sided tape, moreover, may have an exposed inner major surface adjacent the at least one electrical conductor and an outer major surface opposite the exposed inner major surface. An outer silicate layer may be secured to the outer major surface of the flexible tape substrate of the single-sided tape. The single-sided tape may comprise only one silicate layer, the outer silicate layer secured to the major surface of the tape substrate.

The at least one electrical conductor of the high-voltage winding, more specifically, typically will comprise a material having high electrical conductivity, such as copper. In addition, the at least one electrical conductor may be a plurality of electrical conductors. The plurality of electrical conductors, moreover, may be arranged in substantially parallel relation to define a generally rectangular cross-sectional shape.

An additional aspect of the invention pertains to a method for making a high-voltage winding for a dynamoelectric machine. The method may include forming an insulator around at least one electrical conductor, the insulator being formed by wrapping at least one tape around the at least one electrical conductor thereby defining at least one wrapped layer. The method, moreover, may further include forming an electrically conductive layer around the insulator.

With respect to wrapping at least one tape around the at least one electrical conductor to define a wrapped layer, the at least one tape may comprise a double-sided tape having both inner and outer silicate layers. The double-sided tape may include a flexible tape substrate having an inner major surface adjacent the at least one electrical conductor and an outer major surface opposite the inner major surface, inner silicate layer secured to the inner major surface and the outer silicate layer secured to the outer major surface.

The method may further include wrapping the double-sided tape to define at least an outermost wrapped layer of the insulator. Wrapping, according to the method, may include wrapping the double-sided tape to define at least one half-lapped wrapped layer. Alternately, the wrapping may include wrapping the double-sided tape to define at least one butt-lapped wrapped layer.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The prime notation indicates similar elements in alternate embodiments.

Figure 1A:
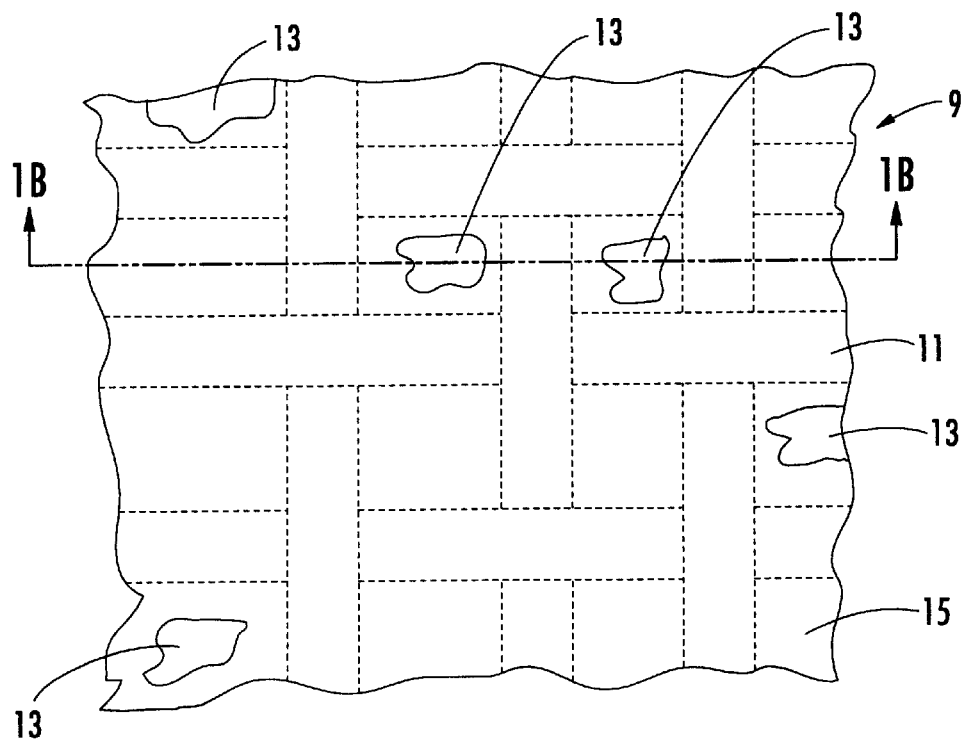
FIG. 1A is a top plan view of winding insulation according to the prior art.
Figure 1B:
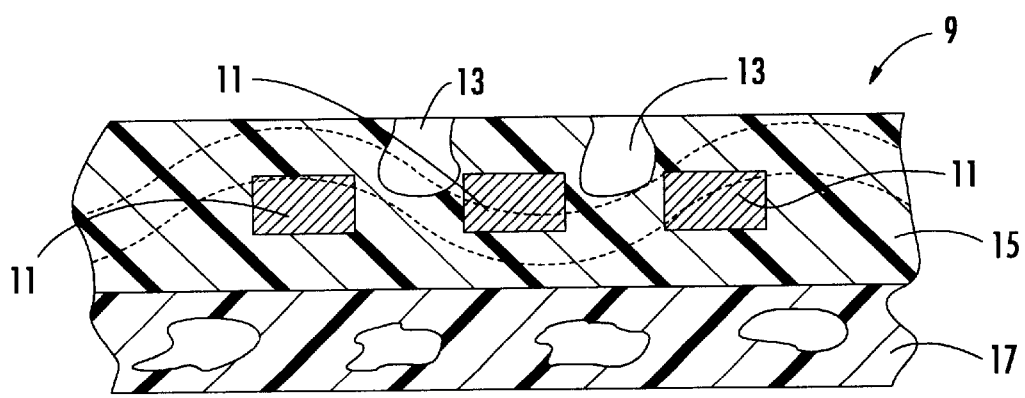
FIG. 1B is a cross-sectional view taken along line 1B—1B of FIG. 1A.
Figure 2:
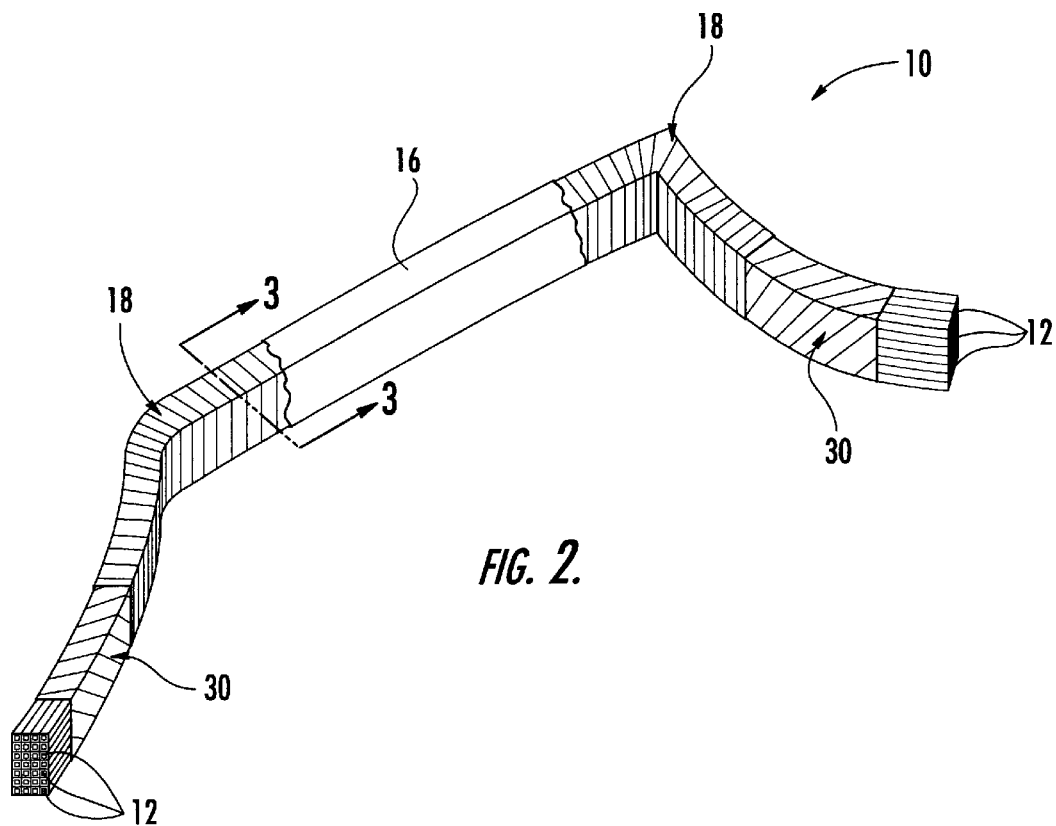
FIG. 2 is a perspective fragmentary view of a high-voltage winding consistent with the illustrated embodiment of the present invention.
Figure 3:
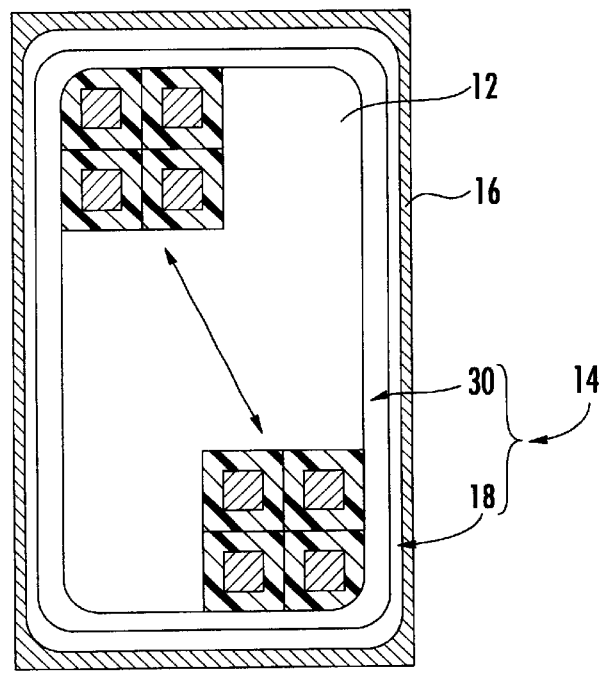
FIG. 3 is a cross-sectional view taken along lines 3—3 of FIG. 2.

Referring initially to FIGS. 2 and 3, a high-voltage winding 10 according to the invention is first described. More specifically, the high-voltage winding 10 may be for use in a dynamoelectric machine and, as shown, may include electrical conductors 12, an insulator 14 surrounding the conductors, and an electrically conductive layer 16 surrounding the insulator.

Illustratively, the conductors are arranged in substantially parallel relation to define a generally rectangular cross-sectional shape. As will be readily appreciated by one skilled in the art, each of the plurality of electrical conductors may be formed of a material having a high electrical conductivity, such as copper, and an insulating layer surrounding the copper. In other embodiments, only a single conductor may be used.

The insulator 14 may include at least one tape arranged to define at least one wrapped layer surrounding the conductors 12. More particularly, the insulator includes a single-sided tape 30, and a double-sided tape 18 surrounding the single-sided tape. A conductive layer 16 surrounds the double-sided tape 18. The conductive layer 16 serves as a ground electrode and may comprise a paint or other coating.

Figure 4:
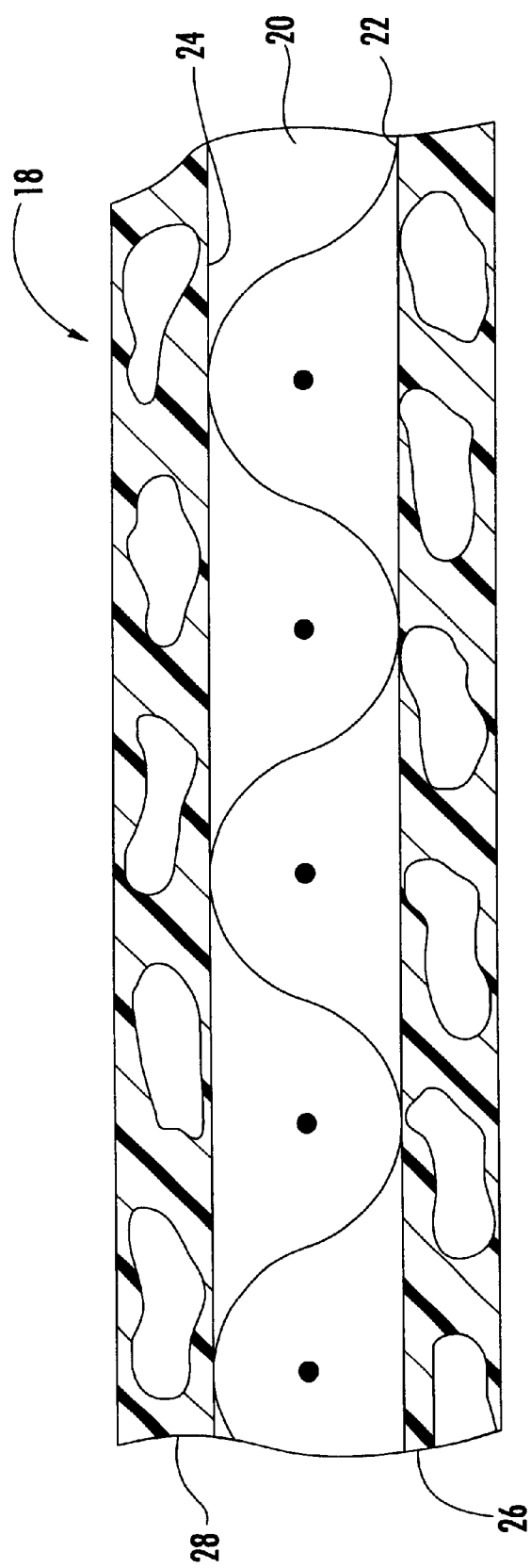
FIG. 4 is a greatly enlarged, schematic cross-sectional view of the dual-sided tape as used in the high-voltage winding of FIG. 2.
Figure 5:
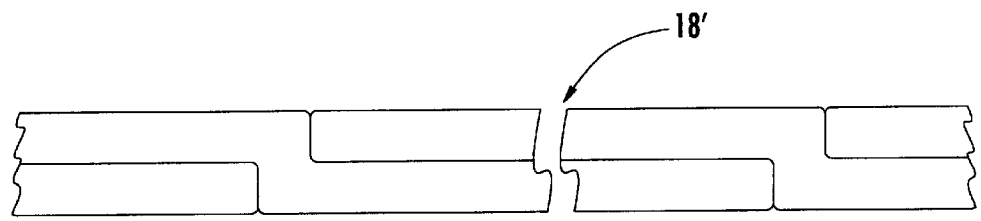
FIGS. 5 and 6 are schematic longitudinal cross-sectional views of the double-sided tape as shown in FIG. 2 in a half-lapped and butt-lapped configuration, respectively.
Figure 6:
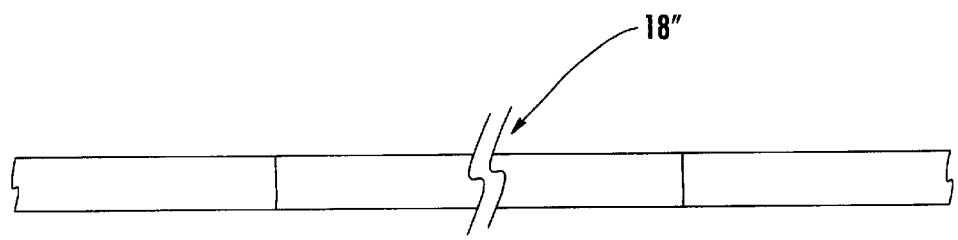

Turning now additionally to FIGS. 4–6, the double-sided tape 18 illustratively includes a flexible tape substrate 20 having an inner major surface 22 adjacent the electrical conductors 12 and an outer major surface 24 opposite the inner major surface. An inner silicate layer 26 is secured to the inner major surface 22 of the flexible tape substrate 20. In addition, an outer silicate layer 28 is secured to the outer major surface 24 of the flexible tape substrate 20. As will be readily appreciated by those skilled in the art, each of the silicate layers 26, 28 may include silica, a crystalline compound, $SiO_2$, found in quartz, sand, or flint. As will also be readily understood by those skilled in the art, the silicate layers 26, 28 may comprise mica, one of a group of silicates, such as $KAl2AlSi_3O_{10}(OH)_2$ or $KMg_3AlSi_3O_{10}(OH)_2$ known to have particularly high dielectric strength, low dielectric loss, high resistivity, thermal stability, and corona resistance.

Illustratively, the double-sided tape 18 defines at least an outermost wrapped layer of the insulator 14. The double-sided tape 18, may be arranged to define at least one half-lapped wrapped layer 18' (FIG. 5), or alternately, the double-sided tape may be arranged to define at least one butt-lapped wrapped layer 18" (FIG. 6).

Figure 7:
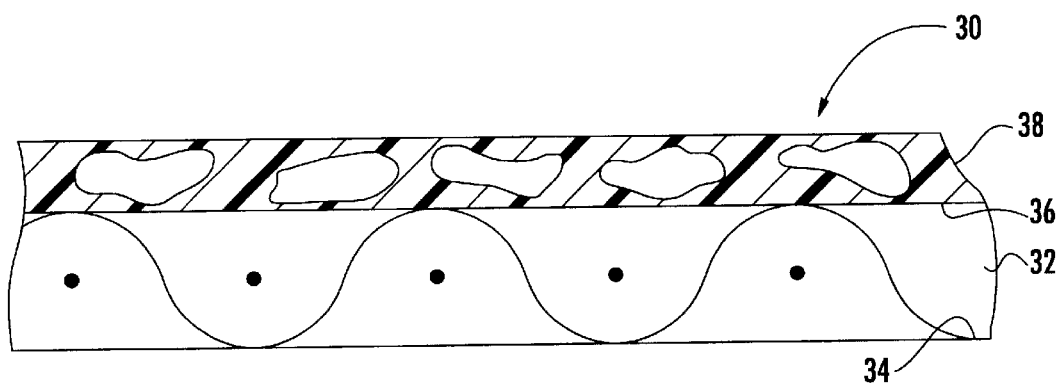
FIG. 7 is a greatly enlarged, schematic cross-sectional view of a single-sided tape as used in the high-voltage winding FIG. 2.

Turning now additionally to FIG. 7, the single-sided tape 30 is further described. The single-sided tape 30 may be arranged in a plurality of wrapped layers between the electrical conductors 12 and the double-sided tape 18. The single-sided tape 30 preferably includes a flexible tape substrate 32. The flexible tape substrate 32 of the single-sided tape 30 has an exposed inner major surface 34 adjacent the electrical conductors 12 and an outer major surface 36 opposite the exposed inner major surface. An outer silicate layer 38 is illustratively secured to the outer major surface 36 of the flexible tape substrate 32 of the single-sided tape 30. The outer silicate layer 38 may comprise of any of the silicate materials described above.

The high-voltage winding 10 has distinct advantages over a conventional one. A conventional high-voltage winding, for example, relies on an insulator formed of layered wrappings, usually formed of a tape having a glass backing or base formed of a similar material. Owing to such a base or backing, the insulator of a conventional high-voltage winding provides only an irregular insulating surface when applied around the electrical conductors. The irregular surface typically leaves voids. With even small voids, partial discharge can occur beneath the electrically conductive ground layer that normally surrounds the insulator and one or more underlying conductors. Partial discharges can damage the conductive layer, which, in turn can result in damaging corona activity and eventually in a complete breakdown of the insulator that, in turn, may ultimately result in winding failure.

By contrast, the insulator 14 of the present invention includes a double-sided tape 18 having dual silicate layers 26, 28 that can provide a surface substantially free of voids. Accordingly, the resulting void-free surface reduces the risks of partial discharge. The reduced risk of partial discharge, in turn, results in less risk of corona activity and ultimate failure of the winding. Accordingly, the insulator 14 according to the present invention results in a high-voltage winding 10 less susceptible to damage and failure.

An additional aspect of the present invention relates to a method for making a high-voltage winding for a dynamoelectric machine. The method includes forming an insulator 14 around at least one electrical conductor 12 and forming an electrically conductive layer 16 surrounding the insulator. More specifically, the insulator 14 may be formed by wrapping at least one tape 18 around the at least one electrical conductor 12 to define at least one wrapped layer, the tape being a double-sided tape including a flexible substrate 20 that has an inner major surface 22 adjacent the at least one electrical conductor 12 and an outer major surface 24 opposite the inner major surface. Moreover, as described above, an inner silicate layer 26 may be secured to the inner major surface 22 of the flexible tape substrate 20, and an outer silicate layer 28 may be secured to the outer major surface 24 of the flexible tape substrate.

The method includes wrapping the double-sided tape 18 to define at least an outermost wrapped layer of the insulator 14. As will be readily understood by those skilled in the art, the double-sided tape 18 may be wrapped to define at least one half-lapped wrapped layer, or alternatively, to define at least one butt-lapped wrapped layer.

The method also includes wrapping a single-sided tape 30 arranged in a plurality of wrapped layers between the at least one electrical conductor 12 and the double-sided tape 18. As also described above, the single-sided tape 30 may include a flexible tape substrate 32 having an exposed inner major surface 34 adjacent the at least one electrical conductor 12 and an outer major surface 36 opposite the exposed inner major surface. An outer silicate layer 38 may be secured to the outer major surface 36 of the flexible tape substrate 30.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

What is claimed is:

1. A high-voltage winding for a dynamoelectric machine comprising:
    at least on electrical conductor;
    an insulator comprising at least one tape arranged to define at least one wrapped layer surrounding said at least one electrical conductor, said at least one tape comprising a double-sided tape including
        a flexible tape substrate having an inner major surface adjacent said at least one electrical conductor and an outer major surface opposite the inner major surface,
        an inner silicate layer secured to the inner major surface of said flexible tape substrate, and
        an outer silicate layer secured to the outer major surface of said flexible tape substrate; and an electrically conductive layer surrounding said insulator.

2. A high-voltage winding according to claim 1 wherein said double-sided tape defines at least an outermost wrapped layer of said insulator.

3. A high-voltage winding according to claim 1 wherein said double-sided tape is arranged to define at least one half-lapped wrapped layer.

4. A high-voltage winding according to claim 1 wherein said double-sided tape is arranged to define at least one butt-lapped wrapped layer.

5. A high-voltage winding according to claim 1 wherein said at least one tape further comprises a single-sided tape arranged in a plurality of wrapped layers between said at least one electrical conductor and said double-sided tape.

6. A high-voltage winding according to claim 5 wherein said single-sided tape comprises:
    a flexible tape substrate having an exposed inner major surface adjacent said at least one electrical conductor and an outer major surface opposite the exposed inner major surface; and
    an outer silicate layer secured to the outer major surface of said flexible tape substrate.

7. A high-voltage winding according to claim 1 wherein said at least one electrical conductor comprises copper.

8. A high-voltage winding according to claim 1 wherein said at least one electrical conductor comprises a plurality of electrical conductors arranged in substantially parallel relation defining a generally rectangular cross-sectional shape.

9. A high-voltage winding according to claim 1 wherein said outer electrically conductive layer comprises a tape impregnated with carbon and resin.

10. A high-voltage winding for a dynamoelectric machine comprising:
    a plurality of electrical conductors;
    an insulator comprising a single-sided tape arranged to define at least one wrapped layer surrounding said plurality of electrical conductors and a double-sided tape arranged to define at least one wrapped layer surrounding the at least one wrapped layer of said single-sided tape, said single-sided tape comprising only an outer silicate layer and said double-sided tape comprising inner and outer silicate layers; and
    an electrically conductive layer surrounding said insulator.

11. A high-voltage winding according to claim 10 wherein said double-sided tape defines at least an outermost wrapped layer of said insulator.

12. A high-voltage winding according to claim 10 wherein said double-sided tape is arranged to define at least one half-lapped wrapped layer.

13. A high-voltage winding according to claim 10 wherein said double-sided tape is arranged to define at least one butt-lapped wrapped layer.

14. A high-voltage winding according to claim 10 wherein each of said plurality of electrical conductors comprises copper.

15. A high-voltage winding according to claim 10 wherein said electrical conductors are arranged in substantially parallel relation defining a generally rectangular cross-sectional shape.

16. A method for making a high-voltage winding for a dynamoelectric machine comprising:
    forming an insulator surrounding at least one electrical conductor by wrapping at least one tape surrounding the at least one electrical conductor to define at least one wrapped layer, the at least one tape comprising a double-sided tape comprising inner and outer silicate layers; and
    forming an electrically conductive layer surrounding the insulator.

17. A method according to claim 16 wherein the double-sided tape comprises:
- a flexible tape substrate having an inner major surface adjacent the at least one electrical conductor and an outer major surface opposite the inner major surface;
- an inner silicate layer secured to the inner major surface of the flexible tape substrate; and
- an outer silicate layer secured to the outer major surface of the flexible tape substrate.

18. A method according to claim 16 wherein wrapping comprises wrapping the double-sided tape to define at least an outermost wrapped layer of the insulator.

19. A method according to claim 16 wherein wrapping comprises wrapping the double-sided tape to define at least one half-lapped wrapped layer.

20. A method according to claim 16 wherein wrapping comprises wrapping the double-sided tape to define at least one butt-lapped wrapped layer.

21. A method according to claim 16 wherein wrapping the at least one tape further comprises wrapping a single-sided tape arranged in a plurality of wrapped layers between the at least one electrical conductor and the double-sided tape.

22. A method according to claim 21 wherein the single-sided tape comprises:
- a flexible tape substrate having an exposed inner major surface adjacent the at least one electrical conductor and an outer major surface opposite the exposed inner major surface; and
- an outer silicate layer secured to the outer major surface of the flexible tape substrate.

23. A method according to claim 16 wherein the at least one electrical conductor comprises copper.

24. A method according to claim 16 wherein the at least one electrical conductor comprises a plurality of electrical conductors arranged in substantially parallel relation defining a generally rectangular cross-sectional shape.

* * * * *